United States Patent
Ishizuka et al.

(10) Patent No.: US 10,146,492 B2
(45) Date of Patent: Dec. 4, 2018

(54) INFORMATION PROCESSING SYSTEM, IMAGE FORMING APPARATUS, AND INFORMATION PROCESSING APPARATUS FOR TRANSMITTING INFORMATION FROM A DEVICE TO AN EXTERNAL DEVICE

(71) Applicant: FUJI XEROX CO., LTD., Tokyo (JP)

(72) Inventors: Ryuichi Ishizuka, Kanagawa (JP); Chigusa Nakata, Kanagawa (JP); Hiroshi Honda, Kanagawa (JP); Eiji Nishi, Kanagawa (JP); Yoshihiro Sekine, Kanagawa (JP); Kenji Kuroishi, Kanagawa (JP); Hiroshi Mikuriya, Kanagawa (JP); Takeshi Furuya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/477,141

(22) Filed: Apr. 3, 2017

(65) Prior Publication Data
US 2018/0074767 A1   Mar. 15, 2018

(30) Foreign Application Priority Data
Sep. 14, 2016 (JP) .................................. 2016-179961

(51) Int. Cl.
*G06F 3/12* (2006.01)
*H04N 1/00* (2006.01)

(52) U.S. Cl.
CPC ............ *G06F 3/1293* (2013.01); *G06F 3/121* (2013.01); *G06F 3/1236* (2013.01); *G06F 3/1261* (2013.01); *G06F 3/1288* (2013.01); *H04N 1/00127* (2013.01)

(58) Field of Classification Search
None
See application file for complete search history.

(56) References Cited

U.S. PATENT DOCUMENTS

2009/0213418 A1*  8/2009  Kaneko .............. H04N 1/00344
                                                 358/1.15
2009/0284791 A1   11/2009  Osada
2013/0301062 A1* 11/2013  Yamazaki .......... G06K 15/4055
                                                 358/1.5

FOREIGN PATENT DOCUMENTS

JP         2009-278243 A    11/2009

* cited by examiner

*Primary Examiner* — Andrew H Lam
(74) *Attorney, Agent, or Firm* — Sughrue Mion, PLLC (57) ABSTRACT

An information processing system includes
an image forming apparatus that
  includes an image forming unit that forms an image on a recording medium,
  receives information from a device provided in an office room, and
  transmits the information to an external device, and
an information processing apparatus that
  is capable of receiving the information from the device, and
  transmits the information from the device to the external device when the image forming apparatus is not capable of transmitting the information to the external device.

10 Claims, 4 Drawing Sheets

INFORMATION PROCESSING SYSTEM, IMAGE FORMING APPARATUS, AND INFORMATION PROCESSING APPARATUS FOR TRANSMITTING INFORMATION FROM A DEVICE TO AN EXTERNAL DEVICE

CROSS-REFERENCE TO RELATED APPLICATIONS

This application is based on and claims priority under 35 USC 119 from Japanese Patent Application No. 2016-179961 filed Sep. 14, 2016.

BACKGROUND

Technical Field

The present invention relates to an information processing system, an image forming apparatus, and an information processing apparatus.

SUMMARY

According to an aspect of the invention, there is provided an information processing system including:
an image forming apparatus that
includes an image forming unit that forms an image on a recording medium,
receives information from a device provided in an office room, and
transmits the information to an external device; and
an information processing apparatus that
is capable of receiving the information from the device, and
transmits the information from the device to the external device when the image forming apparatus is not capable of transmitting the information to the external device.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to the accompanying drawings.

Figure 1:
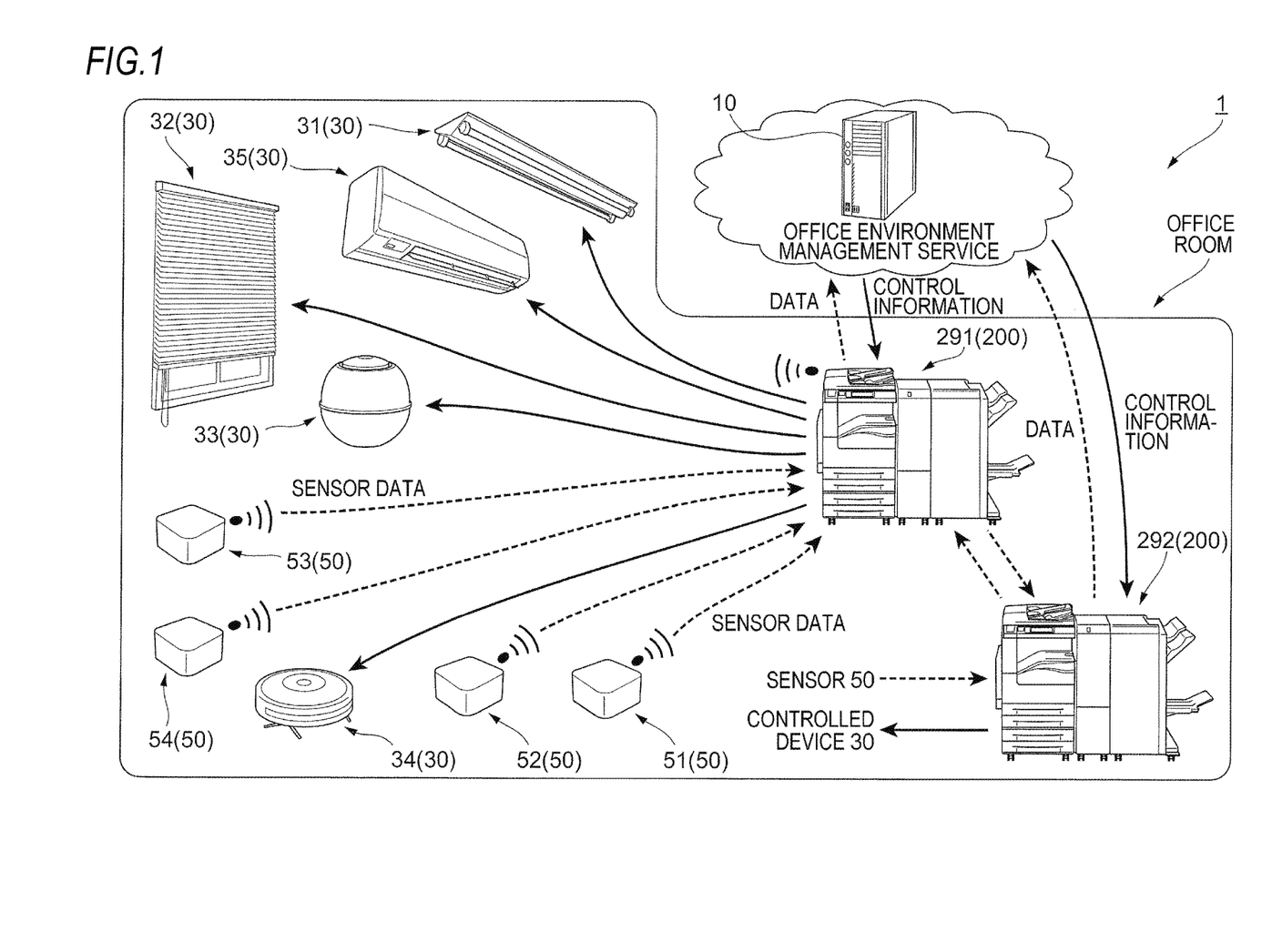
FIG. 1 is a view illustrating the overall configuration of an office environment management system.

FIG. 1 is a view illustrating the overall configuration of an office environment management system 1.

The office environment management system 1 as an example of an information processing system is provided with plural image forming apparatuses 200 (a first image forming apparatus 291 and a second image forming apparatus 292) that function as gateways and edge servers.

Further, the office environment management system 1 is provided with a management server 10 as an example of an external device provided on a cloud.

In the exemplary embodiment, the image forming apparatuses 200 (the first image forming apparatus 291 and the second image forming apparatus 292) transmit/receive information with the management server 10.

Each of the first image forming apparatus 291 and the second image forming apparatus 292 is provided in an office room (an office) where a user is working. Further, each of the first image forming apparatus 291 and the second image forming apparatus 292 has a FAX function and a scanner function in addition to the image forming function.

Further, in the exemplary embodiment, the first image forming apparatus 291 and the second image forming apparatus 292 may communicate with each other via a communication line such as a LAN.

Further, in the exemplary embodiment, two image forming apparatuses 200 are provided, but three or more image forming apparatuses 200 may be provided.

Further, the office environment management system 1 is provided with plural controlled devices 30 connected to the management server 10 via the first image forming apparatus 291 and controlled by the management server 10. Further, plural sensors 50 connected to the management server 10 via the first image forming apparatus 291 and configured to grasp the situations around the plural sensors 50 are provided in the office room.

The controlled devices 30 and the sensors 50 are also connected to the second image forming apparatus 292. In addition, the controlled devices 30 and the sensors 50 are connected to the management server 10 via the second image forming apparatus 292.

The controlled devices 30, as an exemplary device, transmit/receive signals with the first image forming apparatus 291. In addition, the controlled devices 30 receive control information from the first image forming apparatus 291 (control information transmitted from the management server 10 via the first image forming apparatus 291).

In the exemplary embodiment, as the controlled device 30, for example, a lighting device 31, a blind device 32, a humidifier 33, a cleaning device 34 and an air conditioner 35 are provided.

The lighting device 31 has a light source and turns on/off the light source according to the control information from the management server 10.

The blind device 32 has a blind and a drive mechanism for changing the state of the blind to thereby change the state of the blind according to the control information from the management server 10. Accordingly, the amount of external light entering the office room is changed.

The humidifier 33 has a mechanism for evaporating water, and humidifies the interior of the office room according to the control information from the management server 10.

The cleaning device 34 has a suction mechanism for sucking dusts in the office, and is moved in the office room to collect dusts in the office room in accordance with the control information from the management server 10.

The air conditioner 35 has a heating source and the like, and controls air conditioning in the office in accordance with the control information from the management server 10.

Further, in the exemplary embodiment, as other exemplary devices, the various sensors 50 are provided.

Specifically, in the exemplary embodiment, a temperature sensor 51 for measuring temperature, a humidity sensor 52 for measuring humidity, and an illuminance sensor 53 for measuring illuminance are provided. In addition, a human sensor 54 includes an infrared sensor or the like and configured to detect a person in the office room is provided.

Each of the sensors 50 uses wireless communication or wired communication (i.e., communicates with the first image forming apparatus 291) to transmit acquired information to the first image forming apparatus 291. Then, the first image forming apparatus 291 transmits the information from the sensor 50 to the management server 10.

Furthermore, in the office environment management system 1, the control information used to control the controlled device 30 is transmitted from the management server 10 to the first image forming apparatus 291. Then, the first image forming apparatus 291 transmits the control information to the corresponding controlled device 30.

As will be described later, when the first image forming apparatus 291 is not capable of transmitting/receiving information, in the exemplary embodiment, the output information from each of the sensors 50 is transmitted to the management server 10 via the second image forming apparatus 292 which is an example of an information processing apparatus.

Furthermore, when the first image forming apparatus 291 is not capable of transmitting/receiving information, the control information from the management server 10 is transmitted to the controlled device 30 via the second image forming apparatus 292.

Figure 2:
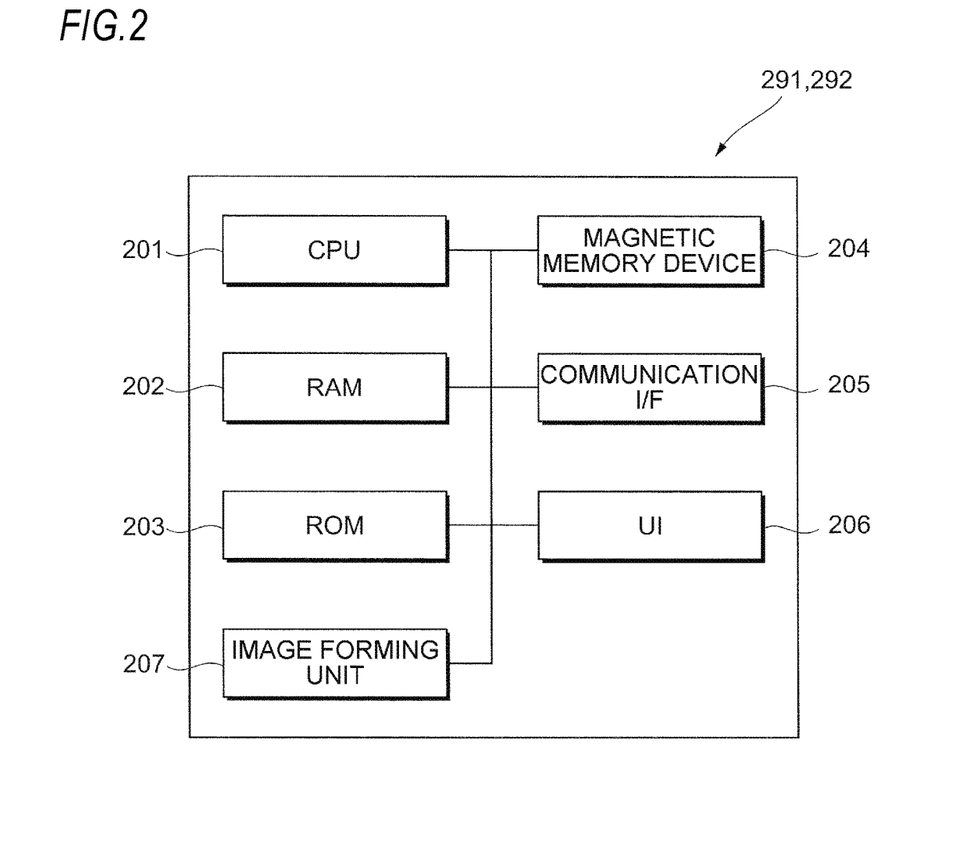
FIG. 2 is a diagram illustrating a hardware configuration of a first image forming apparatus and a second image forming apparatus.

FIG. 2 is a diagram illustrating a hardware configuration of the first image forming apparatus 291 and the second image forming apparatus 292.

As illustrated in FIG. 2, each of the first image forming apparatus 291 and the second image forming apparatus 292 includes a central processing unit (CPU) 201, a random access memory (RAM) 202, a read only memory (ROM) 203 and a magnetic storage device 204. Further, each of the first image forming apparatus 291 and the second image forming apparatus 292 includes a communication interface (communication I/F) 205 for communicating with the outside.

Further, each of the first image forming apparatus 291 and the second image forming apparatus 292 includes a user interface (UI) 206 and an image forming unit 207.

The UI 206 includes, for example, a touch panel type display, displays information to a user, and receives an operation from the user.

The image forming unit 207 uses an electrophotographic system, an inkjet head method or the like to form an image on a sheet which is an example of a recording medium.

The ROM 203 and the magnetic storage device 204 store programs to be executed by the CPU 201. The CPU 201 reads a program stored in the ROM 203 or the magnetic storage device 204 and executes the program with the RAM 202 as a work area.

When the programs stored in the ROM 203 and the magnetic storage device 204 are executed by the CPU 201, functional units to be described later are implemented.

Here, the programs to be executed by the CPU 201 may be provided to the first image forming apparatus 291 and the second image forming apparatus 292 in such a form that the programs are stored in a computer-readable recording medium such as a magnetic recording medium (a magnetic tape, a magnetic disk or the like), an optical recording medium (an optical disc or the like), a magneto-optical recording medium, a semiconductor memory, or the like.

Further, the programs to be executed by the CPU 201 may be downloaded to the first image forming apparatus 291 and the second image forming apparatus 292 via a communication unit such as the Internet.

Figure 3:
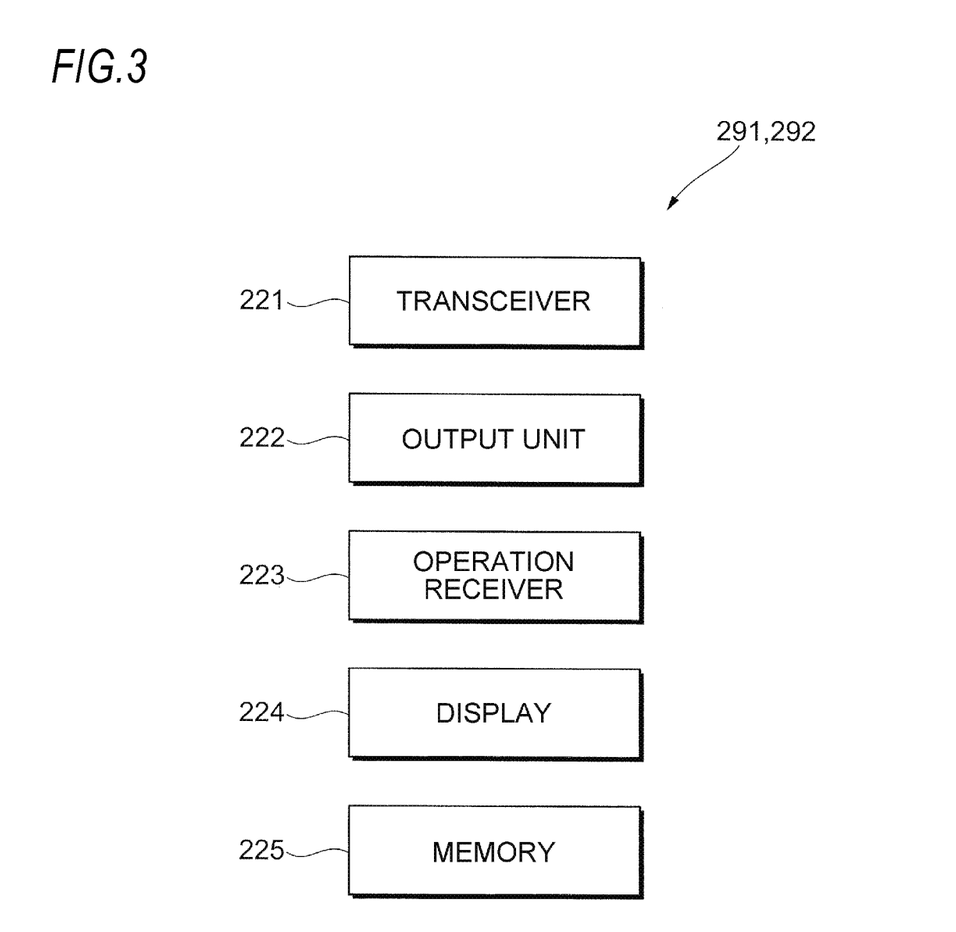
FIG. 3 is a diagram illustrating functional units implemented by a CPU or the like provided in each of the first image forming apparatus and the second image forming apparatus.

FIG. 3 is a diagram illustrating functional units implemented by the CPU 201 or the like provided in each of the first image forming apparatus 291 and the second image forming apparatus 292.

As illustrated in FIG. 3, each of the first image forming apparatus 291 and the second image forming apparatus 292 is provided with a transceiving unit 221. The transceiving unit 221 is implemented by the CPU 201 that executes a program related to transmission/reception of information and the communication I/F 205.

The transceiving unit 221 receives the control information from the management server 10. The received control information is transmitted to the controlled devices 30. In addition, the transceiving unit 221 receives the information output from the controlled devices 30. Further, the transceiving unit 221 receives the information output from the sensors 50. Then, the transceiving unit 221 transmits the information output from the controlled devices 30 and the sensors 50 to the management server 10.

Furthermore, the transceiving unit 221 transmits/receives information with another image forming apparatus.

Specifically, the transceiving unit 221 of the first image forming apparatus 291 transmits information to the second image forming apparatus 292 and receives information from the second image forming apparatus 292.

The transceiving unit 221 of the second image forming apparatus 292 transmits information to the first image forming apparatus 291 and receives information from the first image forming apparatus 291.

Further, as illustrated in FIG. 3, each of the first image forming apparatus 291 and the second image forming apparatus 292 includes an output unit 222.

The output unit 222 is implemented by the CPU 201 that executes a program related to output of information. The output unit 222 outputs the information from the controlled devices 30 and the sensors 50, which is received by the transceiving unit 221. More specifically, the output unit 222 displays the information from the controlled devices 30 and the sensors 50 on a display 224 or prints out the information on a sheet using the image forming unit 207 (see FIG. 2).

Each of the first image forming apparatus 291 and the second image forming apparatus 292 includes an operation receiver 223, the display 224 and a memory 225.

The operation receiver 223 is implemented by, for example, the CPU 201 (see FIG. 2) that executes a program related to operation reception, and the UI 206. The operation receiver 223 receives information input by the user in the office room.

The display 224 includes the UI 206 (see FIG. 2), and displays information to the user in the office room. The memory 225 includes the magnetic storage device 204 (see FIG. 2) or the like, and stores information.

In the meantime, there are cases where the first image forming apparatus 291 fails, maintenance of the first image forming apparatus 291 is performed, etc. In such cases, it becomes impossible to control the controlled devices 30 via the first image forming apparatus 291. Further, the information output from the sensors 50 is not transmittable to the management server 10. In other words, it is not possible to transmit information from the first image forming apparatus 291 to the management server 10 nor to transmit information from the first image forming apparatus 291 to the controlled devices 30.

In the exemplary embodiment, when it is not possible to use the first image forming apparatus 291 due to malfunction or maintenance of the first image forming apparatus 291 (when information is not transmittable/receivable via the first image forming apparatus 291), an image forming apparatus to perform a process is switched from the first image forming apparatus 291 to the second image forming apparatus 292 which is an example of an information processing apparatus.

In the exemplary embodiment, the second image forming apparatus 292 transmits control information to the controlled devices 30 and transmits the information output from the sensors 50 and the controlled devices 30 to the management server 10.

Figure 4:
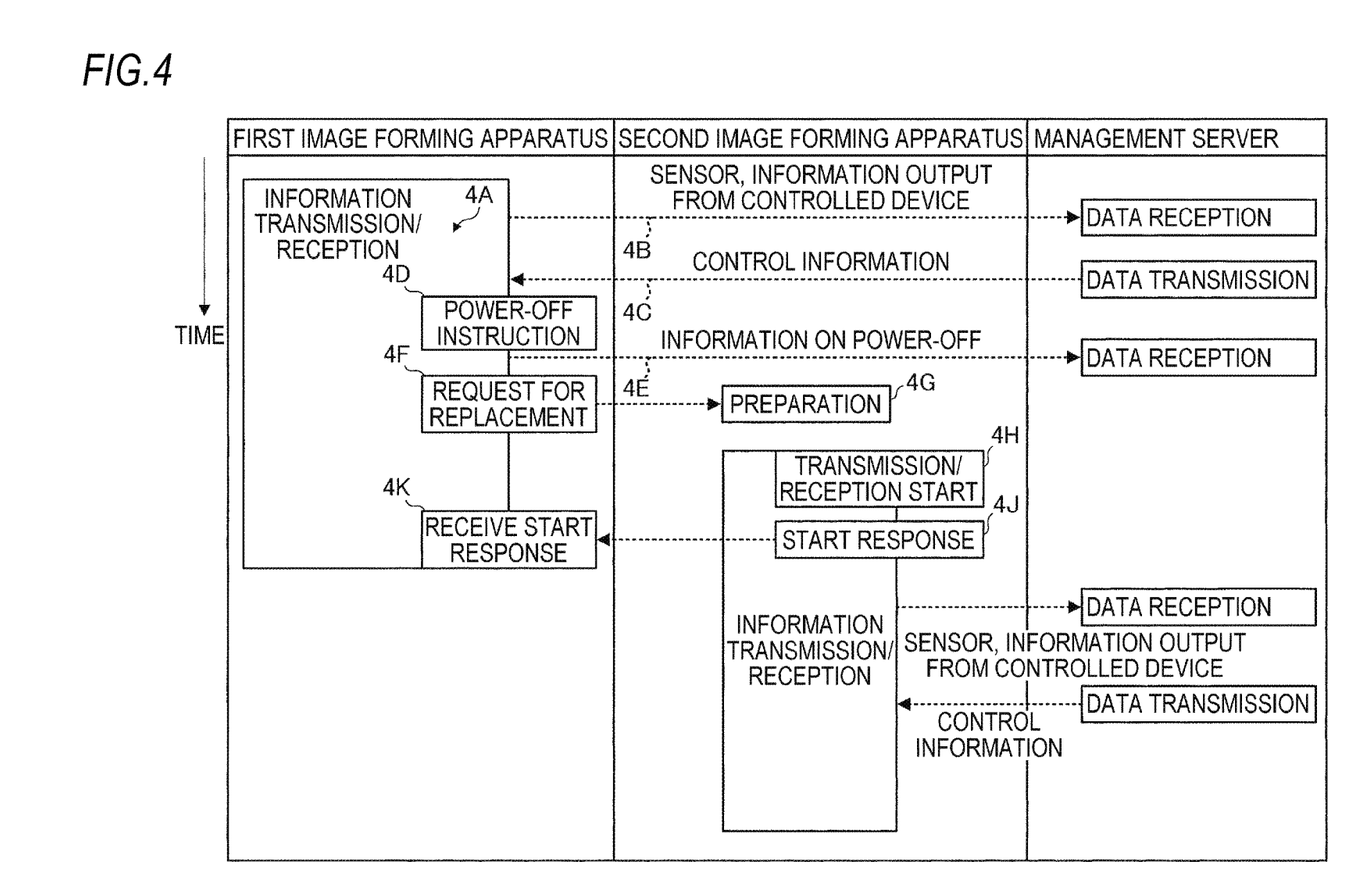
FIG. 4 is a diagram illustrating a flow of a process when an image forming apparatus that performs the process is switched from the first image forming apparatus to the second image forming apparatus.

FIG. 4 is a diagram illustrating a flow of a process when an image forming apparatus 200 that performs the process is switched from the first image forming apparatus 291 to the second image forming apparatus 292.

In the exemplary embodiment, before the switching of the image forming apparatus 200 is performed, the first image forming apparatus 291 is transmitting/receiving information, as denoted by reference numeral 4A in FIG. 4.

Specifically, before the switching of the image forming apparatus 200 is performed, the first image forming apparatus 291 is transmitting the information output from the sensors 50 and the controlled devices 30 to the management server 10 (see reference numeral 4B), and the first image forming apparatus 291 is also receiving the control information from the management server 10 (see reference numeral 4C) and further is transmitting the control information to the controlled devices 30.

In the switching of the image forming apparatus 200, first, as denoted by reference numeral 4D, an operation by an operator is performed in the first image forming apparatus 291, and an instruction to power the first image forming apparatus 291 off is issued to the first image forming apparatus 291.

Next, as denoted by reference numeral 4E, information indicating that the first image forming apparatus 291 is powered off is transmitted to and received by the management server 10.

Next, as denoted by reference numeral 4F, the first image forming apparatus 291 issues a request for replacement to the second image forming apparatus 292. Specifically, the first image forming apparatus 291 transmits a replacement request signal to the second image forming apparatus 292.

Upon receiving the replacement request signal, the second image forming apparatus 292 performs a predetermined preparatory process for replacement, as denoted by reference numeral 4G.

Then, when the preparation is completed, the second image forming apparatus 292 starts transmission/reception of information, as denoted by reference numeral 4H. Specifically, transmission of the information output from the sensors 50 and the controlled devices 30 to the management server 10 and transmission of the control information acquired from the management server 10 to the controlled devices 30 are started.

Thereafter, the second image forming apparatus 292 transmits, to the first image forming apparatus 291, a response indicating that the transmission/reception of the information has started (hereinafter referred to as a "start response"), as denoted by reference numeral 4J.

Then, the first image forming apparatus 291 receives the start response, as denoted by reference numeral 4K. Upon receiving the start response, the first image forming apparatus 291 performs a process of powering itself off. When the first image forming apparatus 291 is powered off, the transmission of information from the first image forming apparatus 291 to the management server 10 and the transmission of information from the first image forming apparatus 291 to the controlled devices 30 are stopped.

Through the above-described process, in the exemplary embodiment, even when the first image forming apparatus 291 is powered off due to maintenance or the like, the information output from the controlled devices 30 and the sensors 50 is transmitted to the management server 10, and the control information used to control the controlled devices 30 is transmitted to the controlled devices 30. This prevents erroneous omission of the collection of information output from the controlled devices 30 and the sensors 50 and prevents an occurrence of a situation in which the controlled devices 30 is not controllable.

More specifically, in the exemplary embodiment, after the transmission/reception of information by the second image forming apparatus 292 is started, the first image forming apparatus 291 is powered off (the transmission/reception of information by the first image forming apparatus 291 is stopped). As a result, as compared with a configuration in which the first image forming apparatus 291 is powered off before the transmission/reception of information by the second image forming apparatus 292 is started, the erroneous omission of the collection of information is less likely to occur and an occurrence of a situation in which the controlled devices 30 is not controllable is suppressed.

After receiving the start response, the first image forming apparatus 291 may transmit information acquired after receiving the start response (the information acquired from the sensors 50 and the controlled devices 30) to the second image forming apparatus 292. In other words, after receiving the start response, the first image forming apparatus 291 may transmit some of the information received from the sensors 50 and the controlled devices 30, as takeover confirmation sign information, to the second image forming apparatus 292.

In this case, the second image forming apparatus 292 determines whether or not the takeover has been normally completed, based on the information transmitted from the first image forming apparatus 291 and the information acquired by itself (the information received from the sensors 50 and the controlled devices 30). When the takeover has been normally completed, the information transmitted from the first image forming apparatus 291 and the information acquired by itself (the second image forming apparatus 292) match each other.

In addition, the first image forming apparatus 291 may transmit the information acquired before receiving the start response (the information received from the sensors 50 and the controlled devices 30) to the second image forming apparatus 292.

In this case, the second image forming apparatus 292 performs a process of combining the information acquired from the first image forming apparatus 291 and the information acquired by itself, and a process of excluding deduplicating information. Then, the second image forming apparatus 292 transmits information acquired after performing the combining process and the deduplication excluding process to the management server 10.

Here, in the exemplary embodiment, when the first image forming apparatus 291 receives the start response, information that has not yet been transmitted to the management server 10 may be left in the first image forming apparatus 291. More specifically, the information from the sensors 50 and the controlled devices 30 may not be sequentially transmitted, but the first image forming apparatus 291 may transmit the information for each predetermined information unit. In this case, information less than this information unit may be left in the first image forming apparatus 291.

On the other hand, as in the exemplary embodiment, when the information acquired before the start response is received (the information from the sensors 50 and the controlled devices 30, which is left in the first image forming apparatus 291) is transmitted to the second image forming apparatus 292, the second image forming apparatus 292 may generate information of a predetermined information unit.

Then, in this case, the second image forming apparatus 292 transmits the information of the predetermined information unit to the management server 10. As a result, it is possible to avoid a situation in which some of the information transmitted to the management server 10 is lost.

In addition, the transmission to the management server 10 may be transmission of information generated by performing calculation or determination on the information of the predetermined information unit. Specifically, an average value for the information of the predetermined information unit may be transmitted. Furthermore, when it is determined that a difference between the average value and the latest information exceeds a preset value, a weighted average value giving a weight to the new information may be transmitted instead of the average value.

Next, a process performed at the time of restoration of the first image forming apparatus 291 (a process performed when the transmission/reception of information is resumed by the first image forming apparatus 291) will be described.

In the exemplary embodiment, a flow of a process performed when the first image forming apparatus 291 is restored is described, but, in a case of an image forming apparatus to which the first image forming apparatus 291 is newly introduced, it is possible to perform the same process as when the first image forming apparatus 291 is restored.

In the exemplary embodiment, the restoring process of the first image forming apparatus 291 (switching process from the second image forming apparatus 292 to the first image forming apparatus 291) is not automatically performed. For example, when the first image forming apparatus 291 is powered on and an instruction to restore the first image forming apparatus 291 is received from the operator (user) through the UI 206 of the first image forming apparatus 291, the first image forming apparatus 291 is restored.

Here, for example, if the restoring process is performed under the only condition that the first image forming apparatus 291 is powered on, there is a possibility that the restoring process is performed at a timing other than the original restoring timing.

More specifically, in the maintenance of the first image forming apparatus 291, power-on/off of the first image forming apparatus 291 may be repeated. In this case, when the restoring process is performed under the only condition that the first image forming apparatus 291 is powered on, the restoring process will be performed in the course of maintenance. Therefore, in the exemplary embodiment, as described above, when the first image forming apparatus 291 is powered on and an instruction to restore the first image forming apparatus 291 is received from the operator, the process of restoring the first image forming apparatus 291 is performed.

After the restoring process of the first image forming apparatus 291 is performed, the first image forming apparatus 291 subsequently receives the information from the sensors 50 and the controlled devices 30, and transmits the received information to the management server 10. Further, after the restoring process of the first image forming apparatus 291 is performed, the first image forming apparatus 291 subsequently transmits controlled information, which is transmitted from the management server 10, to the controlled devices 30.

In the restoring process, as in the above case, takeover confirmation sign information may be transmitted from the second image forming apparatus 292 to the first image forming apparatus 291.

In addition, in the restoring process, similarly to the above, information left in the second image forming apparatus 292 may be transmitted to the first image forming apparatus 291.

(Other Processes)

In the above description, the case where the second image forming apparatus 292 serving as a substitution has the information transmitting/receiving function in advance has been described as an example. However, the information transmitting/receiving function may be not included in the second image forming apparatus 292 beforehand but given when the switching process of the image forming apparatus 200 is performed.

Specifically, for example, when the switching process of the image forming apparatus 200 is performed, a program (information) for implementing the transmitting/receiving function may be transmitted from the first image forming apparatus 291, the management server 10 or the like to the second image forming apparatus 292 to give the transmitting/receiving function to the second image forming apparatus 292.

More specifically, in the exemplary embodiment, the first image forming apparatus 291 issues a request for replacement to the second image forming apparatus 292 as described above, but, for example, the program for implementing the transmitting/receiving function may be transmitted, together with this replacement request, to the second image forming apparatus 292.

In the above description, the case where the second image forming apparatus 292 is used as a substitution has been described as an example, but an apparatus other than the image forming apparatus 200, such as a personal computer (PC), may be used as a substitution.

In addition, in the above description, the case where the second image forming apparatus 292 is used as a substitution has been described as an example, but one or more selected by the user from plural apparatuses which are candidates for substitutions may be used as substitutions.

Here, the selection of a substitution by the user is performed, for example, by the user operating the UI 206 of the first image forming apparatus 291. More specifically, for example, substitution candidates are listed on the UI 206 of the first image forming apparatus 291, and the user selects a substitution from this list.

In addition, in the above description, the switching process is performed when the first image forming apparatus 291 is powered off by the user, but the present invention is not limited to this. For example, when a failure of the first image forming apparatus 291 is detected, the switching process may be automatically performed.

In the case where the failure of the first image forming apparatus 291 is detected, it is assumed that maintenance will be performed later. When the switching process is automatically performed at the time of detection of the failure of the first image forming apparatus 291, the switching process is performed prior to the maintenance.

Furthermore, the process of switching from the first image forming apparatus 291 to the second image forming apparatus 292 may be performed at a predetermined date and time.

In the image forming apparatus 200, regular maintenance may have been predetermined (i.e., the date and time of maintenance may have already been determined) (or the powering-off time may have been predetermined). In this case, without waiting for the regular maintenance to be started, the switching process may be performed at a predetermined timing before a timing at which the regular maintenance is started.

When the first image forming apparatus 291 and the second image forming apparatus 292 are connected to a maintenance system via a maintenance remote line, the first image forming apparatus 291 and the second image forming apparatus 292 may be instructed by the maintenance system via the remote line to start the switching process.

Further, the maintenance system may set a scheduled maintenance time in the first image forming apparatus 291 and the second image forming apparatus 292 through the remote line, and the first image forming apparatus 291 and the second image forming apparatus 292 may automatically start the switching process at a predetermined timing before this scheduled maintenance time.

In addition, the restoring process of the first image forming apparatus 291 (the process of switching from the second image forming apparatus 292 to the first image forming apparatus 291) may also be performed through the maintenance remote line.

In this case, for example, when a maintenance process is completed, first, a person in charge of the maintenance inputs information indicating that the maintenance process has been completed to the maintenance system. Then, upon receiving the information that the maintenance process has been completed, the maintenance system instructs the first image forming apparatus 291 and the second image forming apparatus 292 to perform the switching process. According to this instruction, the process of switching from the second image forming apparatus 292 to the first image forming apparatus 291 is executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   an image forming apparatus comprising:
      an image forming unit configured to form an image on a recording medium;
      a receiver configured to receive information from a device provided in an office room; and
      a transmitter configured to transmit the information to an external device; and
   an information processing apparatus comprising:
      a second receiver configured to receive the information from the device; and
      a second transmitter configured to transmit the information from the device to the external device in response to the image forming apparatus being incapable of transmitting the information to the external device;
   wherein the number of the information processing apparatus is two or more,
   wherein some of the information processing apparatuses transmit information from the device to the external device when the image forming apparatus is not capable of transmitting information to the external device, and
   wherein the some information processing apparatuses that transmit the information to the external device are user selectable.

2. The information processing system according to claim 1, wherein the image forming apparatus is configured to receive control information for controlling the device from the external device, and to transmit the control information to the device, and
   wherein the information processing apparatus is configured to receive the control information from the external device, and to transmit the control information from the external device to the device in response to the image forming apparatus being incapable of transmitting the control information to the device.

3. The information processing system according to claim 2, wherein the image forming apparatus is configured to transmit some of the information received from the device to the information processing apparatus.

4. The information processing system according to claim 2, wherein the image forming apparatus has a transmitting/receiving function of receiving information from the device and of transmitting the information to the external device, and
   wherein information for implementing the transmitting/receiving function in the information processing apparatus is transmitted from the image forming apparatus or the external device to the information processing apparatus.

5. The information processing system according to claim 3, wherein the image forming apparatus has a transmitting/receiving function of receiving information from the device and of transmitting the information to the external device, and
   wherein information for implementing the transmitting/receiving function in the information processing apparatus is transmitted from the image forming apparatus or the external device to the information processing apparatus.

6. The information processing system according to claim 1, wherein the image forming apparatus is configured to transmit some of the information received from the device to the information processing apparatus.

7. The information processing system according to claim 6, wherein the image forming apparatus has a transmitting/receiving function of receiving information from the device and of transmitting the information to the external device, and
   wherein information for implementing the transmitting/receiving function in the information processing apparatus is transmitted from the image forming apparatus or the external device to the information processing apparatus.

8. The information processing system according to claim 1, wherein the image forming apparatus has a transmitting/ receiving function of receiving information from the device and of transmitting the information to the external device, and wherein information for implementing the transmitting/receiving function in the information processing apparatus is transmitted from the image forming apparatus or the external device to the information processing apparatus.

9. The information processing system according to claim 1, wherein transmission of information from the image forming apparatus to the external device is resumed when the user issues an instruction.

10. The information processing system according to claim 1, wherein the information processing apparatus includes an image forming apparatus that forms an image on a recording medium.

* * * * *